(12) United States Patent
Okado et al.

(10) Patent No.: US 12,001,047 B2
(45) Date of Patent: Jun. 4, 2024

(54) SURFACE LIGHT SOURCE

(71) Applicant: NICHIA CORPORATION, Anan (JP)

(72) Inventors: Ryoma Okado, Naruto (JP); Satoshi Yoshinaga, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/057,284

(22) Filed: Nov. 21, 2022

(65) Prior Publication Data
US 2023/0161096 A1 May 25, 2023

(30) Foreign Application Priority Data
Nov. 24, 2021 (JP) .................... 2021-190118

(51) Int. Cl.
*F21V 8/00* (2006.01)
(52) U.S. Cl.
CPC .......... *G02B 6/0073* (2013.01); *G02B 6/0045* (2013.01)
(58) Field of Classification Search
CPC .............................. G02B 6/0073; G02B 6/0045
See application file for complete search history.

(56) References Cited

U.S. PATENT DOCUMENTS

| | | | | |
|---|---|---|---|---|
| 8,081,271 B2* | 12/2011 | Kobayashi | ........... | G09G 3/3426 349/64 |
| 8,093,827 B2* | 1/2012 | Lee | ........ | H05B 45/10 315/312 |
| 8,212,967 B2* | 7/2012 | Park | ........ | G02F 1/133603 362/97.3 |
| 8,421,362 B2* | 4/2013 | Kato | ........ | G02F 1/133611 315/169.3 |
| 8,506,148 B2* | 8/2013 | Shimizu | ........ | G02B 6/0021 362/97.3 |
| 8,579,456 B2* | 11/2013 | Nozawa | ........ | G09F 13/04 362/555 |
| 9,019,445 B2* | 4/2015 | Shimizu | ........ | G09G 3/3426 362/249.05 |
| 9,074,743 B2* | 7/2015 | Heim | ........ | F21S 8/04 |
| 9,122,094 B2* | 9/2015 | Fujiwara | ........ | G02F 1/133603 |
| 10,001,267 B2* | 6/2018 | Ebner | ........ | F21K 9/60 |
| 10,718,487 B2* | 7/2020 | Yamada | ........ | H01L 33/0075 |

(Continued)

FOREIGN PATENT DOCUMENTS

| | | |
|---|---|---|
| JP | H1021720 A | 1/1998 |
| JP | 2010002486 A | 1/2010 |

(Continued)

*Primary Examiner* — Arman B Fallahkhair
(74) *Attorney, Agent, or Firm* — Hunton Andrews Kurth LLP

(57) ABSTRACT

A light-guiding member includes a plurality of light-emitting portions separated by grooves; and a plurality of light sources each corresponding to a respective one of the plurality of light-emitting portions. The plurality of light-emitting portions include a plurality of outer portions, and at least one inner portion located in a region surrounded by the plurality of outer portions in a plan view. Each of the plurality of outer portions is adjacent to a smaller number of the light-emitting portions than a number of the light-emitting portions adjacent to a single inner portion of the at least one inner portion in a plan view. An area of a single outer portion of the plurality of outer portions is smaller than an area of the single inner portion in the plan view.

9 Claims, 6 Drawing Sheets

(56) References Cited

U.S. PATENT DOCUMENTS

| | | | |
|---|---|---|---|
| 10,775,669 B2 * | 9/2020 | Imada | H01L 33/52 |
| 10,852,467 B2 * | 12/2020 | Watanabe | G02B 6/0031 |
| 10,903,193 B2 * | 1/2021 | Yamada | F21V 7/0083 |
| 11,536,439 B2 * | 12/2022 | Nakabayashi | G02F 1/133606 |
| 11,644,607 B2 * | 5/2023 | Itou | G02B 6/002 |
| | | | 362/97.1 |
| 11,646,298 B2 * | 5/2023 | Yamada | H01L 33/56 |
| | | | 257/88 |
| 2010/0079978 A1 | 4/2010 | Nakamura | |
| 2010/0296026 A1 | 11/2010 | Kubota et al. | |
| 2011/0194034 A1 | 8/2011 | Shimizu | |
| 2012/0139445 A1 | 6/2012 | Fujiwara et al. | |
| 2019/0063723 A1 | 2/2019 | Yamada | |
| 2020/0006297 A1 | 1/2020 | Yamada | |
| 2020/0103703 A1 | 4/2020 | Yoshinaga et al. | |
| 2021/0239298 A1 | 8/2021 | Hashimoto | |
| 2021/0317957 A1 | 10/2021 | Tamura | |

FOREIGN PATENT DOCUMENTS

| | | | |
|---|---|---|---|
| JP | 2010080280 A | 4/2010 | |
| JP | 2011029023 A | 2/2011 | |
| JP | 2019046789 A | 3/2019 | |
| JP | 2019075348 A | 5/2019 | |
| JP | 2020004895 A | 1/2020 | |
| JP | 2020013714 A | 1/2020 | |
| JP | 2020053270 A | 4/2020 | |
| JP | 2021125481 A | 8/2021 | |
| JP | 2021170526 A | 10/2021 | |
| WO | 2010058625 A1 | 5/2010 | |
| WO | 2011024498 A1 | 3/2011 | |
| WO | 2020101038 A1 | 5/2020 | |

* cited by examiner

SURFACE LIGHT SOURCE

CROSS-REFERENCE TO RELATED APPLICATION

This application claims priority to Japanese Patent Application No. 2021-190118 filed on Nov. 24, 2021, the disclosure of which is hereby incorporated by reference in its entirety.

BACKGROUND

1. Field of the Invention

The present disclosure relates to a surface light source.

2. Description of Related Art

Light-emitting modules in which light-guiding plates and light-emitting elements such as light-emitting diodes are combined have been widely used for surface light sources such as backlights for liquid-crystal display devices (for example, see Japanese Unexamined Patent Application Publication No. 2020-13714).

SUMMARY OF THE INVENTION

An object of an exemplary embodiment of the present disclosure is to provide a surface light source in which unevenness in luminance can be reduced.

In an exemplary aspect of the present disclosure, a light-guiding member includes a plurality of light-emitting portions separated by grooves; and a plurality of light sources each corresponding to a respective one of the plurality of light-emitting portions. The plurality of light-emitting portions include a plurality of outer portions, and at least one inner portion located in a region surrounded by the plurality of outer portions in a plan view. Each of the plurality of outer portions is adjacent to a smaller number of the light-emitting portions than a number of the light-emitting portions adjacent to a single inner portion of the at least one inner portion in a plan view. An area of a single outer portion of the plurality of outer portions is smaller than an area of the single inner portion in the plan view.

According to an exemplary embodiment of the present disclosure, a surface light source having reduced unevenness in luminance can be provided.

DETAILED DESCRIPTION OF EMBODIMENTS

Figure 1A:
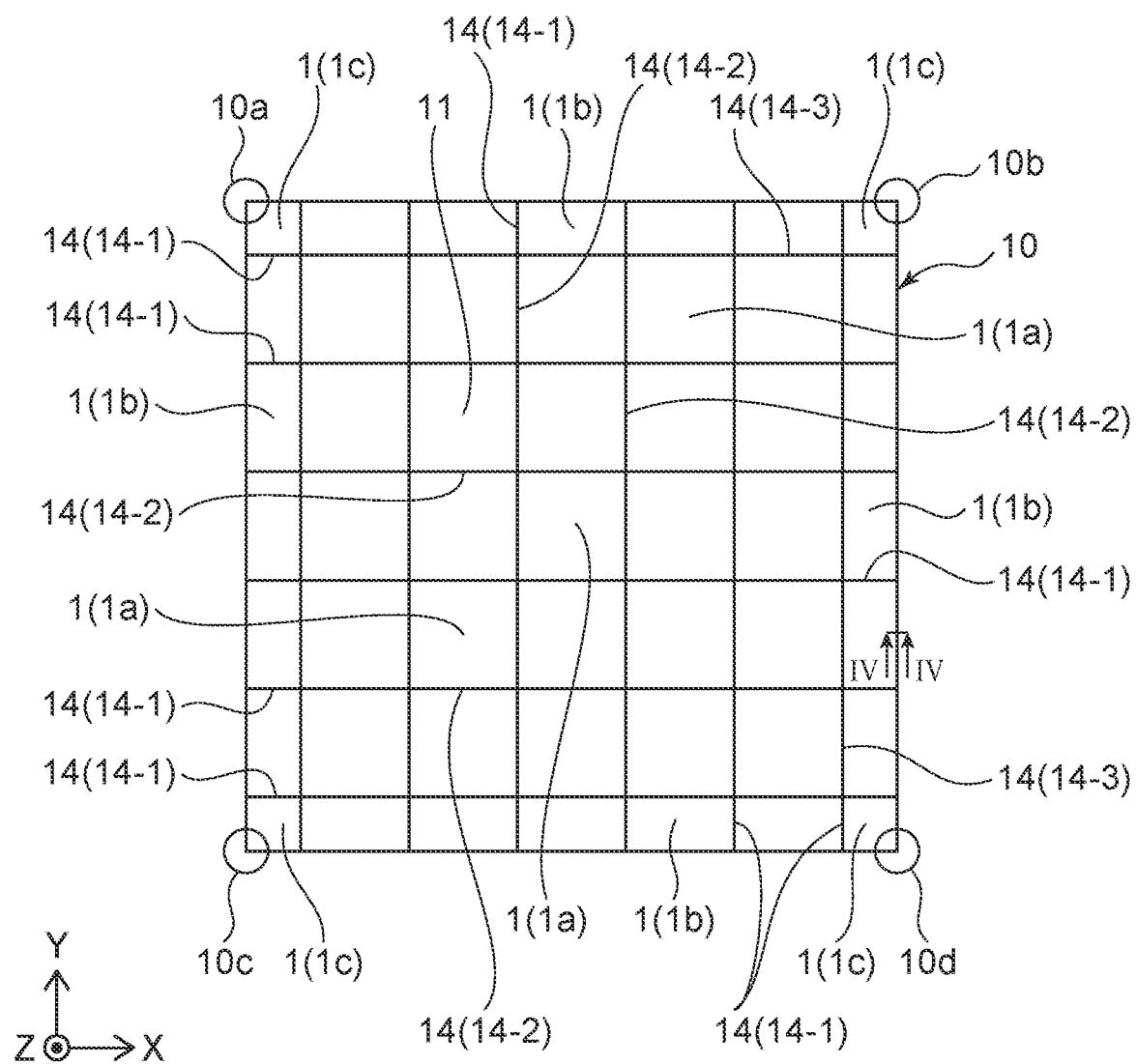
FIG. 1A is a schematic plan view of an exemplary surface light source according to an exemplary embodiment.

A certain embodiment will be described below referring to the accompanying drawings. Each drawing schematically shows the embodiment. Therefore, the scales, the distances, the positional relationships, and the like of members may be exaggerated, or illustration of portions of members may be omitted. Also, cross-sectional end views showing only cut surfaces of members may be shown as cross-sectional views.

In the description below, components having substantially the same function will be shown with the same reference numerals, and repeated descriptions of such components may be omitted. Terms representing particular directions or positions (such as "up/upper," "down/lower," and other terms containing the meanings of these terms) may be used. These terms are used merely for the sake of ease of explanation, representing relative directions or relative positions in the reference drawings. As far as the relative directions or positions mentioned by the terms "upper," "lower," and the like designate the same directions or positions in the reference drawings, drawings other than shown in the present disclosure, actual products, and the like do not have to be the same arrangement as shown in the reference drawings. The term "parallel" in the present specification indicates not only the case in which two straight lines, sides, surfaces, or the like do not intersect even when extended but also the case in which two straight lines, sides, surfaces, or the like intersect to form an angle within the range of 10° or less. The positional relationship represented as "on" in the present specification include both the case in which components are in contact with each other and the case in which a component is not in contact with but is located above another component.

FIG. 1A is a schematic plan view of an exemplary surface light source of an exemplary embodiment.

The surface light source of the embodiment includes a light-guiding member 10. The light-guiding member 10 has a first surface 11 and a second surface 12 (shown in FIG. 3 and the like described below) opposite to the first surface 11. In the present specification, two directions parallel to the first surface 11 of the light-guiding member 10 and orthogonal to each other are referred to as a first direction X and a second direction Y. A direction that extends from the second surface 12 toward the first surface 11 and is orthogonal to the first direction X and the second direction Y is referred to as a third direction Z. For example, the shape of the light-guiding member 10 in a plan view is a quadrangular shape having two sides extending in the first direction X, two sides extending in the second direction Y, and four corners (a first corner 10a, a second corner 10b, a third corner 10c, and a fourth corner 10d). The shape of the light-guiding member 10 may be a polygonal shape such as a hexagonal shape and an octagonal shape having a plurality of corners. In the present specification, the polygonal shape includes shapes having recessed, projecting, or rounded corners in addition to mathematical polygonal shapes.

The light-guiding member 10 includes a plurality of light-emitting portions 1 separated from each other in the first direction X and the second direction Y by grooves 14.

Each light-emitting portion 1 can be used as, for example, a unit of driving of local dimming.

The light-emitting portions 1 include a plurality of outer portions. The outer portions include first outer portions 1b and second outer portions 1c. The second outer portions 1c are located at the corners of the light-guiding member 10 in a plan view. In the surface light source of the embodiment, the second outer portions 1c are respectively located at the first corner 10a, the second corner 10b, the third corner 10c, and the fourth corner 10d. That is, the outer portions include four second outer portions 1c. A plurality of first outer portions 1b are located between the second outer portion 1c located at the first corner 10a and the second outer portion 1c located at the second corner 10b along the first direction X. A plurality of first outer portions 1b are located between the second outer portion 1c located at the third corner 10c and the second outer portion 1c located at the fourth corner 10d along the first direction X. A plurality of first outer portions 1b are located between the second outer portion 1c located at the first corner 10a and the second outer portion 1c located at the third corner 10c along the second direction Y. A plurality of first outer portions 1b are located between the second outer portion 1c located at the second corner 10b and the second outer portion 1c located at the fourth corner 10d along the second direction Y. The first outer portions 1b and the second outer portions 1c are located at the outermost periphery of the region in which the light-emitting portions 1 are arranged in a plan view.

The light-emitting portions 1 further include at least one inner portion 1a located in a region surrounded by a plurality of outer portions in a plan view. In the examples shown in FIG. 1A and FIG. 1B, a plurality of inner portions 1a are located in the region surrounded by a plurality of first outer portions 1b and a plurality of second outer portions 1c in a plan view. For example, the number of inner portions 1a is larger than the number of first outer portions 1b and the number of second outer portions 1c.

In a plan view, a single first outer portion 1b is adjacent to a smaller number of light-emitting portions 1 in the first direction X and the second direction Y than the number of light-emitting portions 1 adjacent to a single inner portion 1a in the first direction X and the second direction Y. In a plan view, a single second outer portion 1c is adjacent to a smaller number of light-emitting portions 1 in the first direction X and the second direction Y than the number of light-emitting portions 1 adjacent to a single inner portion 1a in the first direction X and the second direction Y. In a plan view, a single second outer portion 1c is adjacent to a smaller number of light-emitting portions 1 in the first direction X and the second direction Y than the number of light-emitting portions 1 adjacent to a single first outer portion 1b in the first direction X and the second direction Y.

In a plan view, a single inner portion 1a is adjacent to four light-emitting portions 1 in the first direction X and the second direction Y. In a plan view, a single first outer portion 1b is adjacent to three light-emitting portions 1 in the first direction X and the second direction Y. In a plan view, a single second outer portion 1c is adjacent to two light-emitting portions 1 in the first direction X and the second direction Y.

Figure 1B:
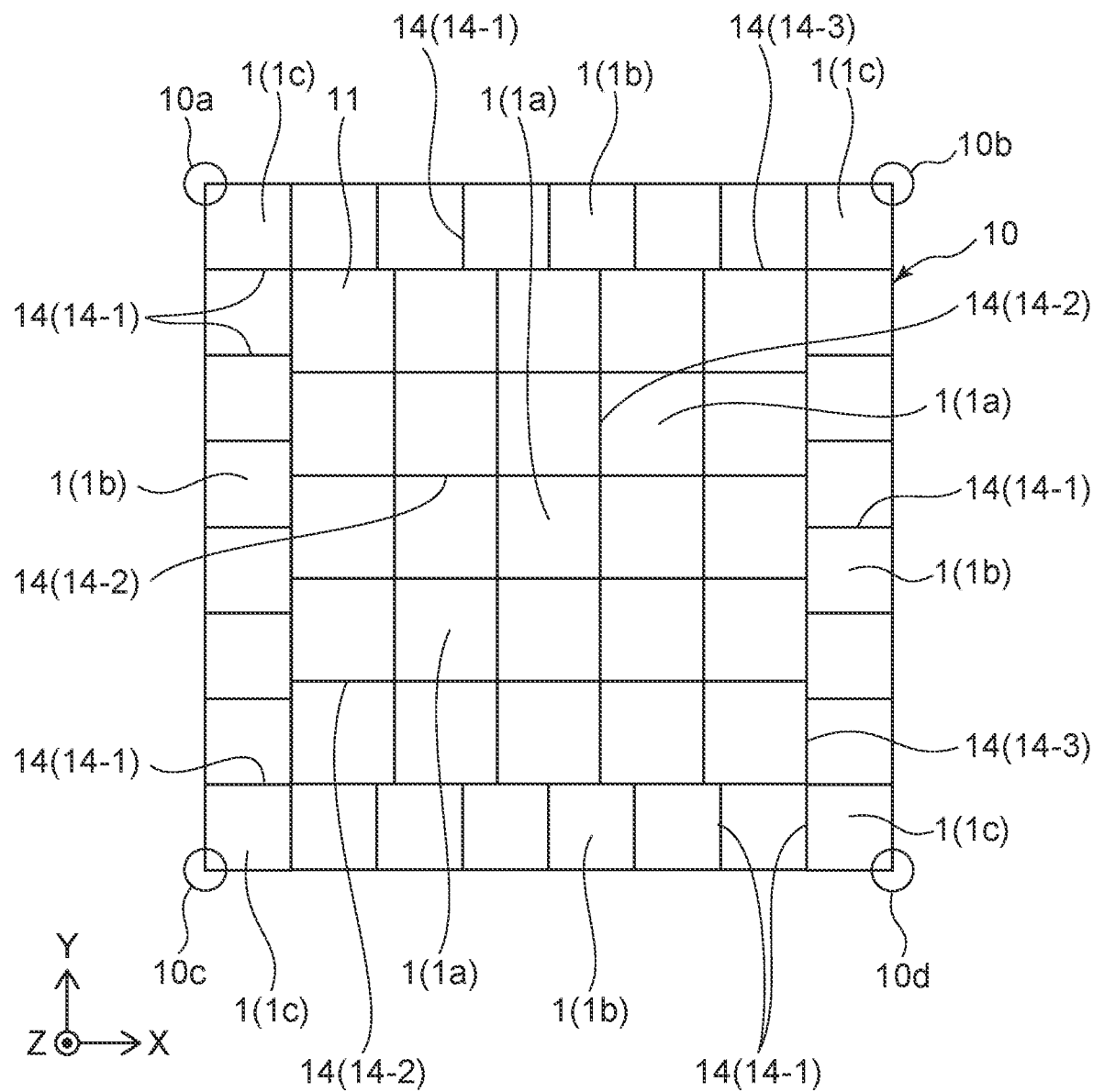
FIG. 1B is a schematic plan view of an exemplary surface light source of an exemplary embodiment.
Figure 2:
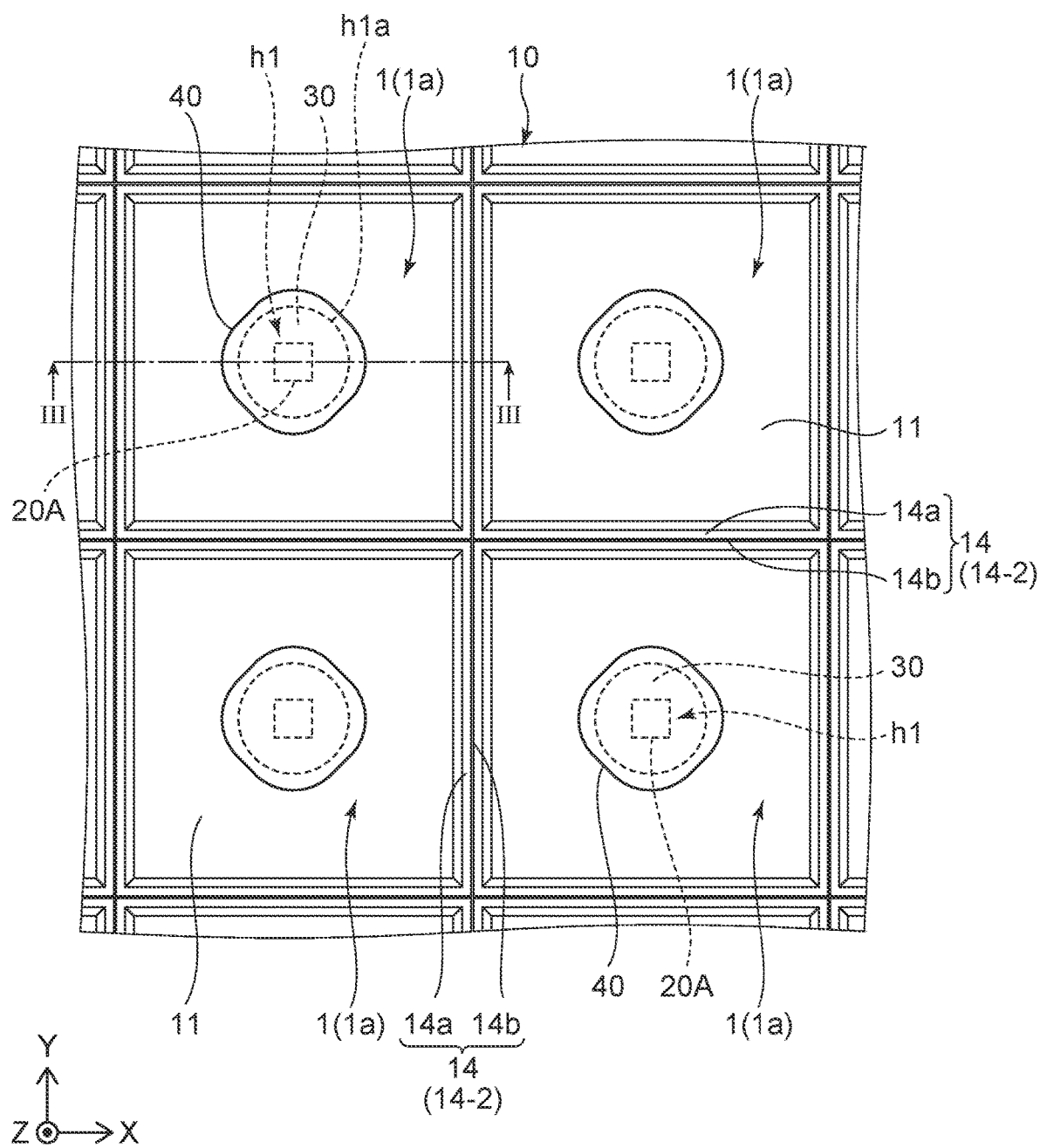
FIG. 2 is a schematic enlarged plan view of a portion of the exemplary surface light source of the exemplary embodiment.

FIG. 2 is a schematic plan view of the region in which the inner portions 1a are located in FIG. 1A and FIG. 1B. FIG. 2 schematically shows the region in which four inner portions 1a are located as an example.

Figure 3:
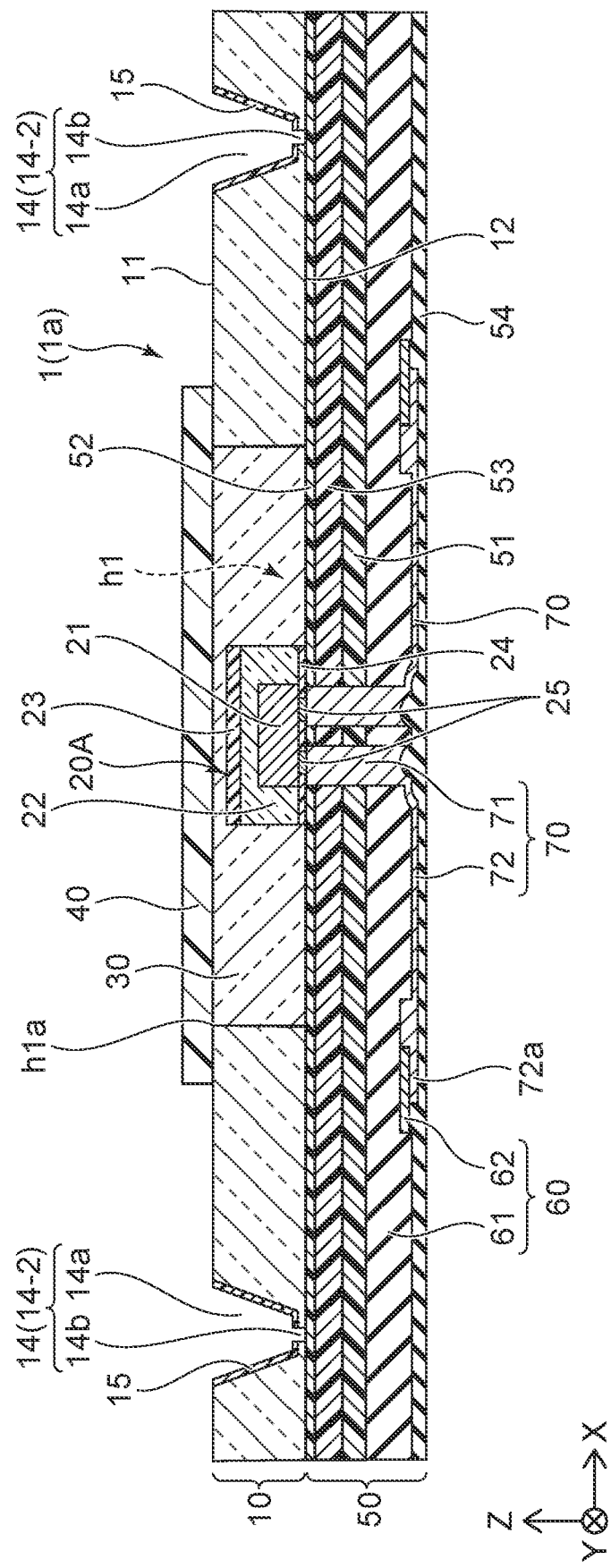
FIG. 3 is a schematic cross-sectional view taken along the line III-III of FIG. 2.

FIG. 3 is a schematic cross-sectional view taken along the line III-III of FIG. 2.

The surface light source of the embodiment includes a plurality of light sources 20A in addition to the light-guiding member 10. The surface light source of the embodiment can further include a supporting member 50, first light-transmissive members 30, and first light-reflective members 40.

Components constituting the surface light source of the embodiment will be described below.

<Light-Guiding Member>

The light-guiding member 10 is a member adapted to transmit light emitted from the light sources 20A. For example, the light-guiding member 10 preferably has a transmittance of 50% or more, more preferably 70% or more, at a peak wavelength of the light sources 20A.

Examples of the material of the light-guiding member 10 include thermoplastic resins such as acrylic, polycarbonates, cyclic polyolefins, poly(ethylene terephthalate), and polyesters, thermosetting resins such as epoxies and silicones, and glass.

For example, the light-guiding member 10 has a thickness of 150 μm or more and 800 μm or less. In the present specification, the thickness of each member indicates the maximum distance between an upper surface and a lower surface of each member in the third direction Z. The light-guiding member 10 may be constituted of a single layer or a layered body of a plurality of layers in the third direction Z. In the case in which the light-guiding member 10 is constituted of a layered body, light-transmissive adhesive layers may be disposed between respective layers. Different types of main materials may be used for the layers of the layered body. Examples of the material of the adhesive layers include thermoplastic resins such as acrylic, polycarbonates, cyclic polyolefins, poly(ethylene terephthalate), and polyesters and thermosetting resins such as epoxies and silicones.

The light-guiding member 10 has first holes h1 extending from the first surface 11 to the second surface 12. For example, each of the first holes h1 can have a circular shape in a plan view as shown in FIG. 2. Alternatively, the first hole h1 may have, for example, an elliptic shape or a polygonal shape such as a triangular shape, a quadrangular shape, a hexagonal shape, and an octagonal shape in a plan view. The term "in a plan view" as used in the present specification refers to viewing in the third direction Z.

As described above, the light-guiding member 10 has the grooves 14 separating the light-emitting portions 1 from one another. For example, the grooves 14 can suppress warpage or the like of the surface light source due to generation of heat from the light sources 20A. As shown in FIG. 3, the grooves 14 each include a first groove portion 14a that is open to the first surface 11 side and a second groove portion 14b that is open to the second surface 12 side. The first groove portion 14a communicates with the second groove portion 14b in the third direction Z. The width of the first groove portion 14a is larger than the width of the second groove portion 14b. The width of the first groove portion 14a and the width of the second groove portion 14b are widths in a direction orthogonal to the direction in which the groove 14 extends.

A dividing member 15 can be disposed in the first groove portion 14a. The dividing member 15 is adapted to reflect light emitted from the light sources 20A. For example, the dividing member 15 is a resin member containing light scattering particles. Examples of the light scattering particles used for the dividing member 15 include particles of titania, silica, alumina, zinc oxide, magnesium oxide, zirconia, yttria, calcium fluoride, magnesium fluoride, niobium pentoxide, barium titanate, tantalum pentoxide, barium sulfate, and glass. Examples of the resin material for the dividing member 15 include thermoplastic resins such as acrylic resins, polycarbonate resins, cyclic polyolefin resins, poly(ethylene terephthalate) resins, and polyester resins and thermosetting resins such as epoxy resins and silicone resins. The dividing member 15 may be a metal member made of aluminum, silver, or the like. For example, the dividing member 15 is disposed along an inner surface of the first groove portion 14a in the form of a film. Alternatively, the dividing member 15 may be filled into the first groove portion 14a.

The dividing member 15 inhibits light from being guided between adjacent light-emitting portions 1. For example, the dividing member 15 inhibits light from being guided from a light-emitting portion 1 that is emitting light to a light-emitting portion 1 that is not emitting light. The control of the luminance of every light-emitting portion 1 is thus facilitated in the case in which local dimming is performed using each light-emitting portion 1 as the unit of driving.

In FIG. 3, the groove 14 extends from the first surface 11 to the second surface 12 of the light-guiding member 10. The groove 14 may be a groove having an opening on the first surface 11 side and a bottom not reaching the second surface 12. The groove 14 may be a groove having an opening on the second surface 12 side and a bottom not reaching the first surface 11. The groove 14 may be a hollow groove located inside the light-guiding member 10.

<Light Source>

The light sources 20A are disposed in the first holes h1 of the light-guiding member 10. Each of the first holes h1 is located in a respective one of the light-emitting portions 1. The light sources 20A are therefore disposed on the respective light-emitting portions 1.

The light sources 20A each include a light-emitting element 21. The light-emitting element 21 includes a semiconductor layered body. For example, the semiconductor layered body includes a substrate such as a sapphire or gallium nitride substrate, an n-type semiconductor layer and a p-type semiconductor layer that are disposed on the substrate, and a light-emitting layer between these layers. The light-emitting element 21 also includes an n-side electrode electrically connected to the n-type semiconductor layer and a p-side electrode electrically connected to the p-type semiconductor layer. The light source 20A further includes a pair of positive and negative electrodes 25 disposed on the lower surface side. One of the pair of electrodes 25 is electrically connected to the p-side electrode, and the other is electrically connected to the n-side electrode.

The semiconductor layered body in which the substrate has been removed may be used. The light-emitting layer may have a structure with a single active layer, such as a double heterostructure and a single quantum well (SQW) structure, or a structure with a group of active layers, such as a multiple quantum well (MQW) structure. The light-emitting layer is configured to emit visible light or ultraviolet light. The light-emitting layer can be configured to emit blue to red light as the visible light. The semiconductor layered body including such a light-emitting layer can contain, for example, $In_xAl_yGa_{1-x-y}N$ ($0 \leq x$, $0 \leq y$, and $x+y \leq 1$). The semiconductor layered body can include at least one light-emitting layer configured to emit light as described above. For example, the semiconductor layered body may include one or more light-emitting layers between the n-type semiconductor layer and the p-type semiconductor layer or may include a repetitive structure including the n-type semiconductor layer, the light-emitting layer, and the p-type semiconductor layer in order. In the case in which the semiconductor layered body includes a plurality of light-emitting layers, light-emitting layers configured to emit light with different peak emission wavelengths may be included, or light-emitting layers configured to emit light with the same peak emission wavelength may be included. The term "the same peak emission wavelength" as used herein indicates that variations of, for example, about several nanometers are included. An appropriate combination of such light-emitting layers can be selected. In the case in which the semiconductor layered body includes two light-emitting layers, a combination of blue light and blue light, green light and green light, red light and red light, ultraviolet light and ultraviolet light, blue light and green light, blue light and red light, or green light and red light can be selected for the light-emitting layers. The light-emitting layers may include a plurality of active layers configured to emit light with different peak emission wavelengths or a plurality of active layers configured to emit light with the same peak emission wavelength.

The light source 20A can further include a second light-transmissive member 22. The second light-transmissive member 22 covers the upper surface and lateral surfaces of the light-emitting element 21. The second light-transmissive member 22 protects the light-emitting element 21 and has the function of wavelength conversion, light diffusion, or the like according to particles added to the second light-transmissive member 22.

For example, the second light-transmissive member 22 contains a light-transmissive resin and may further contain a phosphor. Examples of the light-transmissive resin include silicone resins and epoxy resins. Examples of the phosphor include yttrium-aluminum-garnet-based phosphors (such as $Y_3(Al,Ga)_5O_{12}$:Ce), lutetium-aluminum-garnet-based phosphors (such as $Lu_3(Al,Ga)_5O_{12}$:Ce), terbium-aluminum-garnet-based phosphors (such as $Tb_3(Al,Ga)_5O_{12}$:Ce), CCA-based phosphors (such as $Ca_{10}(PO_4)_6C_{12}$:Eu), SAE-based phosphors (such as $Sr_4Al_{14}O_{25}$:Eu), chlorosilicate-based phosphors (such as $Ca_8MgSi_4O_{16}Cl_2$:Eu), oxynitride-based phosphors such as β-SiAlON phosphors (such as $(Si,Al)_3(O,N)_4$:Eu) and α-SiAlON phosphors (such as $Ca(Si,Al)_{12}(O,N)_{16}$:Eu), nitride-based phosphors such as SLA-based phosphors (such as $SrLiAl_3N_4$:Eu), CASN-based phosphors (such as $CaAlSiN_3$:Eu), and SCASN-based phosphors (such as $(Sr,Ca)AlSiN_3$:Eu), fluoride-based phosphors such as KSF-based phosphors (such as $K_2SiF_6$:Mn), KSAF-based phosphors (such as $K_2Si_{0.99}Al_{0.01}F_{5.99}$:Mn), and MGF-based phosphors (such as $3.5MgO.0.5MgF_2GeO_2$:Mn), phosphors having a perovskite structure (such as $CsPb(F,Cl,Br,I)_3$), and quantum-dot phosphors (such as CdSe, InP, $AgInS_2$, and $AgInSe_2$).

For the phosphor added to the second light-transmissive member 22, a single type of phosphor or a plurality of types of phosphors may be used.

The KSAF-based phosphors may have the composition represented by Formula (I) below.

$$M_2[Si_pAl_qMn_rF_s] \qquad (I)$$

In Formula (I), M represents an alkali metal, and at least K may be contained. Mn may be in the form of tetravalent Mn ions. The values p, q, r, and s may satisfy $0.9 \leq p+q+r \leq 1.1$, $0 < q \leq 0.1$, $0 < r \leq 0.2$, and $5.9 \leq s \leq 6.1$. The relationships $0.95 \leq p+q+r \leq 1.05$ or $0.97 \leq p+q+r \leq 1.03$, $0 < q \leq 0.03$, $0.002 \leq q \leq 0.02$, or $0.003 \leq q \leq 0.015$, $0.005 \leq r \leq 0.15$, $0.01 \leq r \leq 0.12$, or $0.015 \leq r \leq 0.1$, and $5.92 \leq s \leq 6.05$ or $5.99 \leq s \leq 6.025$ may be preferably satisfied. Examples of the composition include $K_2[Si_{0.946}Al_{0.005}Mn_{0.049}F_{5.995}]$, $K_2[Si_{0.942}Al_{0.008}Mn_{0.050}F_{5.992}]$, and $K_2[Si_{0.939}Al_{0.014}Mn_{0.047}F_{5.986}]$. Such a KSAF-based phosphor can provide emission of red light with a high luminance and a narrow half-width of a peak emission wavelength.

A wavelength conversion sheet containing any of the phosphors described above may be disposed on the surface light source. The wavelength conversion sheet absorbs a portion of blue light emitted from the light source 20A to emit yellow, green, and/or red light, thereby providing a surface light source that emits white light. For example, white light can be obtained by combining a light source 20A that can emit blue light and a wavelength conversion sheet containing a phosphor that can emit yellow light. Alternatively, a light source 20A that can emit blue light and a wavelength conversion sheet containing a red phosphor and a green phosphor may be combined. Alternatively, a light source 20A that can emit blue light and a plurality of wavelength conversion sheets may be combined. As the wavelength conversion sheets, for example, a wavelength conversion sheet containing a phosphor that can emit red light and a wavelength conversion sheet containing a phosphor that can emit green light can be selected. Alternatively, a light-emitting element 21 that can emit blue light, a light source 20A including a second light-transmissive member 22 containing a phosphor that can emit red light, and a wavelength conversion sheet containing a phosphor that can emit green light may be combined.

Preferable examples of the yellow phosphor used for the wavelength conversion sheet include the yttrium-aluminum-garnet-based phosphors described above. Preferable examples of the green phosphor used for the wavelength conversion sheet include the phosphors having a perovskite structure and the quantum-dot phosphors described above having narrow half-widths of peak emission wavelengths. Preferable examples of the red phosphor used for the wavelength conversion sheet include the KSF-based phosphors, the KSAF-based phosphors, and the quantum-dot phosphors described above having narrow half-widths of peak emission wavelengths as with the green phosphor. The quantum-dot phosphors have short afterglow times and can be particularly suitably used for a surface light source in which local dimming is performed.

The light source 20A can further include a covering member 24. The covering member 24 is disposed on the lower surface of the light-emitting element 21. The covering member 24 is disposed such that the lower surfaces of the electrodes 25 of the light source 20A are exposed from the covering member 24. The covering member 24 is also disposed on the lower surface of the second light-transmissive member 22 covering the lateral surfaces of the light-emitting element 21.

The covering member 24 is adapted to reflect light emitted from the light source 20A. For example, the covering member 24 is a resin member containing light scattering particles. Examples of the light scattering particles used for the covering member 24 include particles of titania, silica, alumina, zinc oxide, magnesium oxide, zirconia, yttria, calcium fluoride, magnesium fluoride, niobium pentoxide, barium titanate, tantalum pentoxide, barium sulfate, and glass. Examples of a resin material for the covering member 24 include thermoplastic resins such as acrylic resins, polycarbonate resins, cyclic polyolefin resins, poly(ethylene terephthalate) resins, and polyester resins and thermosetting resins such as epoxy resins and silicone resins.

The light source 20A can further include a second light-reflective member 23. The second light-reflective member 23 is disposed on the upper surface of the light source 20A. The second light-reflective member 23 covers the upper surface of the light-emitting element 21. The second light-reflective member 23 is disposed on the upper surface of the second light-transmissive member 22 and controls the amount and direction of emission of light emitted from the upper surface of the second light-transmissive member 22. The second light-reflective member 23 is adapted to reflect and transmit light emitted from the light-emitting element 21. A portion of light emitted from the upper surface of the second light-transmissive member 22 is reflected at the second light-reflective member 23, and another portion of the light is transmitted through the second light-reflective member 23. For example, the transmittance of the second light-reflective member 23 for light emitted from the light-emitting element 21 is preferably 1% or more and 50% or less, more preferably 3% or more and 30% or less. With such a transmittance, the luminance directly above the light source 20A is reduced, thereby reducing unevenness in luminance of the surface light source.

The second light-reflective member 23 can be constituted of a light-transmissive resin and light scattering particles mixed in the light-transmissive resin. Examples of the light-transmissive resin include thermoplastic resins such as acrylic resins, polycarbonate resins, cyclic polyolefin resins, poly(ethylene terephthalate) resins, and polyester resins and thermosetting resins such as epoxy resins and silicone resins. Examples of the light scattering particles include particles of titania, silica, alumina, zinc oxide, magnesium oxide, zirconia, yttria, calcium fluoride, magnesium fluoride, niobium pentoxide, barium titanate, tantalum pentoxide, barium sulfate, and glass. Examples of the second light-reflective member 23 include a metal member made of Al or Ag and a dielectric multilayer film.

Figure 5A:
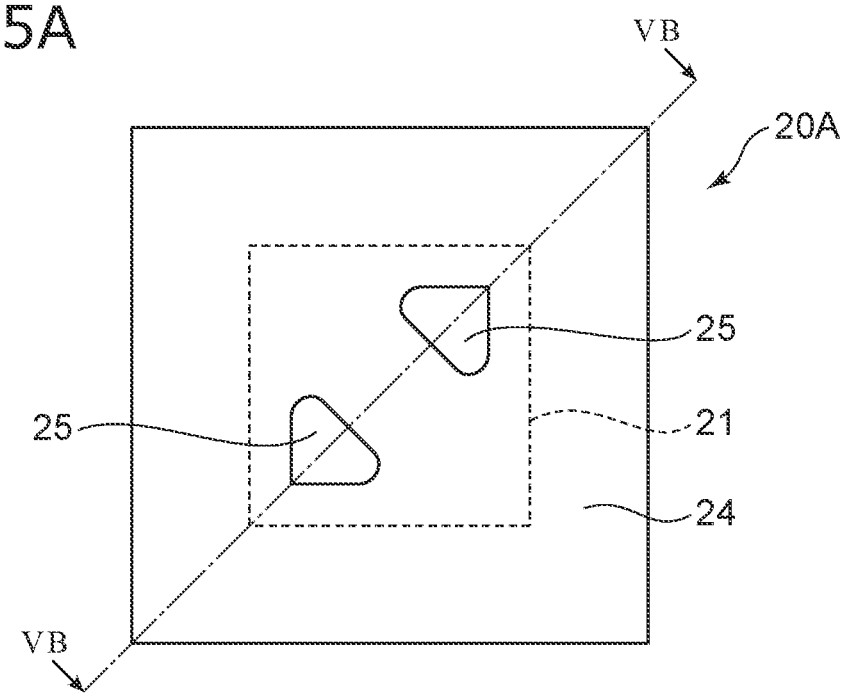
FIG. 5A is a schematic bottom view of an exemplary light source of an exemplary embodiment.
Figure 5B:
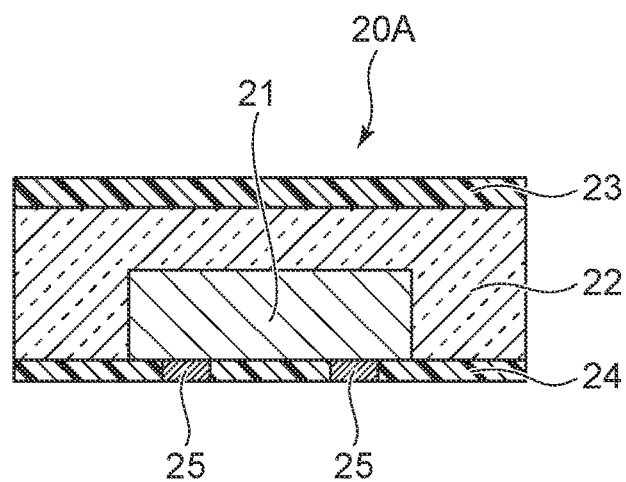
FIG. 5B is a schematic cross-sectional view taken along the line VB-VB of FIG. 5A.
Figure 5C:
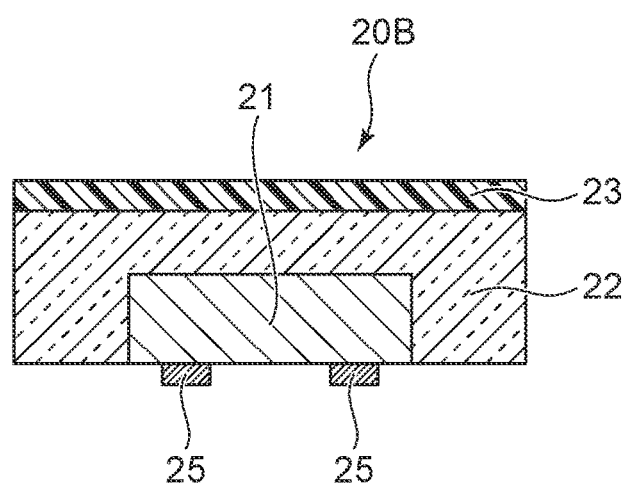
FIG. 5C is a schematic cross-sectional view of a modification of the exemplary light source of the exemplary embodiment.

The light source may not include the covering member 24. For example, a lower surface of a light source 20B shown in FIG. 5C is constituted of the lower surface of the light-emitting element 21 and the lower surface of the second light-transmissive member 22.

Figure 5D:
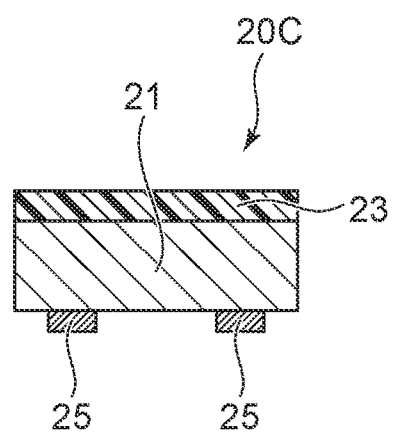
FIG. 5D is a schematic cross-sectional view of a modification of the exemplary light source of the exemplary embodiment.

The light source may be constituted of the light-emitting element 21 only. A light source 20C shown in FIG. 5D does not include the second light-transmissive member 22 or the covering member 24. In the light source 20C, the second light-reflective member 23 may be disposed on the upper surface of the light-emitting element 21. The covering member 24 is not disposed on the lower surface of the light-emitting element 21 of the light source 20C in FIG. 5D, but the covering member 24 may be disposed on the lower surface of the light-emitting element 21.

<First Light-Transmissive Member>

The first light-transmissive member 30 is disposed between lateral surfaces of the light source 20A and the light-guiding member 10 and on the light source 20A in the first hole h1 of the light-guiding member 10. The first light-transmissive member 30 covers the upper surface and lateral surfaces of the light source 20A. The first light-transmissive member 30 is preferably in contact with the light-guiding member 10 and the light source 20A. This structure facilitates guiding of light from the light source 20A to the light-guiding member 10.

The first light-transmissive member 30 is adapted to transmit light emitted from the light source 20A. For example, the first light-transmissive member 30 preferably has a transmittance of 50% or more, more preferably 70% or more, at a peak wavelength of the light source 20A. For example, a resin can be used for the material of the first light-transmissive member 30. For example, the same resin as the light-guiding member 10 or a resin with a small difference in refractive index from the material of the light-guiding member 10 can be used for the material of the first light-transmissive member 30.

The first light-transmissive member 30 may be constituted of a single layer or a layered body of a plurality of layers in the third direction Z. The first light-transmissive member 30 may contain a phosphor and/or a light-diffusing material. In the case in which the first light-transmissive member 30 is a layered body, each layer may or may not contain a phosphor and/or a light-diffusing material. For example, the first light-transmissive member 30 may include a layer containing a phosphor and a layer containing no phosphor.

<First Light-Reflective Member>

The first light-reflective member 40 is disposed on the first light-transmissive member 30. The first light-reflective member 40 is disposed above the light source 20A with the first light-transmissive member 30 therebetween. The first light-reflective member 40 may be in contact with the first light-transmissive member 30 and the light source 20A. The first light-reflective member 40 may be disposed above the first light-transmissive member 30 and the light source 20A with an adhesive resin therebetween. Examples of the adhesive resin include thermoplastic resins such as acrylic resins, polycarbonate resins, cyclic polyolefin resins, poly(ethylene terephthalate) resins, and polyester resins and thermosetting resins such as epoxy resins and silicone resins. As shown in FIG. 2, the first light-reflective member 40 is disposed at a position overlapping the first hole h1 in which the light source 20A and the first light-transmissive member 30 are disposed in a plan view.

The first light-reflective member 40 is adapted to reflect and transmit light emitted from the light source 20A. For example, the transmittance of the first light-reflective member 40 at a peak wavelength of the light source 20A is preferably 1% or more and 50% or less, more preferably 3% or more and 30% or less.

The first light-reflective member 40 can be constituted of a light-transmissive resin and light scattering particles contained in the light-transmissive resin. Examples of the light-transmissive resin include thermoplastic resins such as acrylic resins, polycarbonate resins, cyclic polyolefin resins, poly(ethylene terephthalate) resins, and polyester resins and thermosetting resins such as epoxy resins and silicone resins. Examples of the light scattering particles include particles of titania, silica, alumina, zinc oxide, magnesium oxide, zirconia, yttria, calcium fluoride, magnesium fluoride, niobium pentoxide, barium titanate, tantalum pentoxide, barium sulfate, and glass. In the first light-reflective member 40, the light-transmissive resin described above may not contain light scattering particles but may contain a large number of air bubbles. Examples of the first light-reflective member 40 include a metal member made of aluminum or silver and a dielectric multilayer film.

The upper surface of the first light-reflective member 40 functions as the light-exiting surface (light-emission surface) of the surface light source together with the first surface 11 of the light-guiding member 10. The first light-reflective member 40 reflects a portion of light traveling toward a position above the first hole h1 in which the light source 20A is disposed and transmits another portion of the light. This configuration reduces the difference on the light-exiting surface of the surface light source between the luminance directly above the light source 20A and its vicinity and the luminance in another region. The unevenness in luminance on the light-exiting surface of the surface light source can thus be reduced.

The first light-transmissive member 30 is disposed between the first light-reflective member 40 and the second light-reflective member 23 of the light source 20A. The first light-transmissive member 30 has a higher transmittance for light emitted from the light source 20A than the first light-reflective member 40 and the second light-reflective member 23. The transmittance of the first light-transmissive member 30 with respect to light emitted from the light source 20A can be twice or more and 100 times or less as high as the transmittance of the second light-reflective member 23 and the transmittance of the first light-reflective member 40 in the range of 100% or less. Light emitted from the lateral surfaces of the light source 20A, light reflected by a third light-reflective member 53 described below, and the like travel round and are guided to the first light-transmissive member 30 between the first light-reflective member 40 and the second light-reflective member 23. This allows for preventing the region directly above the light source 20A from being excessively bright or excessively dark, so that unevenness in luminance in the light-exiting surface of the surface light source can be reduced.

Transmission of a portion of light emitted directly upward from the light source 20A is suppressed by the second light-reflective member 23, so that the transmittance of the first light-reflective member 40 for light emitted from the light source 20A is preferably higher than the transmittance of the second light-reflective member 23 to prevent the region directly above the light source 20A from being excessively dark.

<Supporting Member>

The supporting member 50 supports the light-guiding member 10 and the light sources 20A. The light-guiding member 10 is disposed on the supporting member 50 such that the second surface 12 faces the upper surface of the supporting member 50. On the supporting member 50, each of the light sources 20A is disposed in a respective one of the first holes h1.

The supporting member 50 includes a wiring board 60. The wiring board 60 includes an insulating base member 61 and at least one wiring layer 62 disposed on at least one surface of the insulating base member 61. The insulating base member 61 may be a rigid substrate or a flexible substrate. In order to slim down the surface light source, the insulating base member 61 is preferably a flexible substrate. The insulating base member 61 may be constituted of a single layer or a layered body of a plurality of layers in the third direction Z. For example, the insulating base member 61 may be constituted of a single layer of a flexible substrate or a layered body of a plurality of rigid substrates. For example, a resin such as a polyimide can be used for the material of the insulating base member 61. The wiring layer 62 is a metal film such as a copper film.

The supporting member 50 further includes a first adhesive layer 51 disposed on the wiring board 60, the third light-reflective member 53 disposed on the first adhesive layer 51, and a second adhesive layer 52 disposed on the third light-reflective member 53.

The first adhesive layer 51 is disposed on a surface of the insulating base member 61 opposite to the surface on which the wiring layer 62 is disposed. The first adhesive layer 51 is disposed between the insulating base member 61 and the third light-reflective member 53 and bonds the insulating base member 61 and the third light-reflective member 53. For example, the first adhesive layer 51 is a resin layer containing light scattering particles. Examples of the light scattering particles include particles of titania, silica, alumina, zinc oxide, magnesium oxide, zirconia, yttria, calcium fluoride, magnesium fluoride, niobium pentoxide, barium titanate, tantalum pentoxide, barium sulfate, and glass.

Examples of the resin in the first adhesive layer 51 include thermoplastic resins such as acrylic resins, polycarbonate resins, cyclic polyolefin resins, poly(ethylene terephthalate) resins, and polyester resins and thermosetting resins such as epoxy resins and silicone resins.

The third light-reflective member 53 is disposed below the second surface 12 of the light-guiding member 10, below the light sources 20A, below the first light-transmissive members 30, and below the grooves 14. The third light-reflective member 53 is adapted to reflect light emitted from the light sources 20A. For example, a resin member containing a large number of air bubbles or a resin member containing light scattering particles can be used for the third light-reflective member 53. For example, the resin for the third light-reflective member 53 can be selected from the resins listed above as the resins that can be used for the first adhesive layer 51. For example, the light scattering particles can be selected from the light scattering particles listed above as the light scattering particles that can be used for the first adhesive layer 51.

In the region between the third light-reflective member 53 and the first surface 11 of the light-guiding member 10, light emitted from the light sources 20A is guided toward the grooves 14 through the light-guiding member 10 while reflection is repeated between the third light-reflective member 53 and the first surface 11. A portion of light traveling toward the first surface 11 is extracted from the first surface 11 to the outside of the light-guiding member 10. A portion of light traveling toward the second surface 12 is reflected by the third light-reflective member 53 toward the first surface 11, so that the luminance of light extracted from the first surface 11 can be improved. A resin member containing a large number of air bubbles is preferably used for the third light-reflective member 53. The amount of light reflected by the third light-reflective member 53 increases, which facilitates guiding of light emitted from the light sources 20A toward the grooves 14 through the light-guiding member 10. Further, if the first adhesive layer 51 disposed on the lower surface of the third light-reflective member 53 is light-reflective, the luminance of light extracted from the first surface 11 can be further improved.

The second adhesive layer 52 is disposed between the third light-reflective member 53 and the second surface 12 of the light-guiding member 10 and bonds the third light-reflective member 53 and the light-guiding member 10. The light sources 20A are disposed on the second adhesive layer 52 in the first holes h1 of the light-guiding member 10. The second adhesive layer 52 is adapted to transmit light emitted from the light sources 20A. For example, the material of the second adhesive layer 52 can be selected from the resins listed above as the resins that can be used for the first adhesive layer 51. The second adhesive layer 52 may contain light scattering particles that can be selected from, for example, the light scattering particles listed above as the light scattering particles that can be used for the first adhesive layer 51.

The supporting member 50 further includes electroconductive members 70. For example, the electroconductive members 70 include a resin and metal particles mixed in the resin. Examples of the resin for the electroconductive members 70 include epoxy resins and phenolic resins. For example, copper or silver particles can be used for the metal particles.

Each of the electroconductive members 70 includes a connecting portion 71 and a wiring portion 72. The connecting portions 71 extend through the second adhesive layer 52, the third light-reflective member 53, the first adhesive layer 51, and the insulating base member 61 in the third direction Z. The wiring portions 72 are disposed on the surface of the wiring board 60 on which the wiring layer 62 is disposed and are connected to the connecting portions 71. For example, the connecting portion 71 and the wiring portion 72 can be integrally formed of the same material. A portion 72a of the wiring portion 72 is connected to the wiring layer 62.

A pair of electroconductive members 70 are disposed separately from each other to correspond to the pair of positive and negative electrodes 25 of each light source 20A. The connecting portion 71 of one electroconductive member 70 is connected to the positive electrode 25 below the light source 20A, and the connecting portion 71 of the other electroconductive member 70 is connected to the negative electrode 25 below the light source 20A. The electrodes 25 of the light source 20A are electrically connected to the electroconductive members 70 and the wiring layer 62.

The supporting member 50 further includes an insulating layer 54. The insulating layer 54 covers and protects the surface of the wiring board 60 on which the wiring layer 62 is disposed, the wiring layer 62, and the electroconductive members 70.

Figure 4:
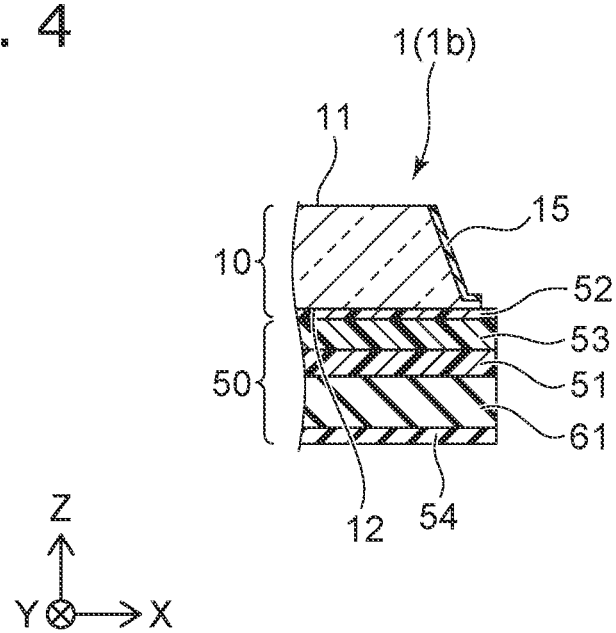
FIG. 4 is a schematic cross-sectional view taken along the line IV-IV of FIG. 1A.

The first outer portions 1b and the second outer portions 1c include the same members as in the inner portions 1a described above. FIG. 4 is a schematic cross-sectional view taken along the line IV-IV of FIG. 1A and schematically shows a cross section of a portion of a first outer portion 1b including an outer lateral surface not adjacent to another light-emitting portion 1. The outer lateral surfaces of the second outer portions 1c not adjacent to other light-emitting portions 1 have the same configuration as the outer lateral surfaces of the first outer portions 1b.

The number of light-emitting portions 1 adjacent to a single first outer portion 1b in a plan view is smaller than the number of light-emitting portions 1 adjacent to a single inner portion 1a, and the number of light-emitting portions 1 adjacent to a single second outer portion 1c is smaller than the number of light-emitting portions 1 adjacent to a single inner portion 1a. Accordingly, the amount of light entering the single first outer portion 1b from its adjacent light-emitting portions 1 is smaller than the amount of light entering the single inner portion 1a from its adjacent light-emitting portions 1, and the amount of light entering the single second outer portion 1c from its adjacent light-emitting portions 1 is smaller than the amount of light entering the single inner portion 1a from its adjacent light-emitting portions 1. Therefore, in an all-lit state in which all the light-emitting portions 1 emit light, the perimeter of the light-guiding member 10 on which the first outer portions 1b and the second outer portions 1c are located therefore tends to be darker than the region in which the inner portions 1a are located.

In the present embodiment, in a plan view, the area of a single first outer portion 1b is smaller than the area of a single inner portion 1a as shown in FIG. 1A. The emission intensity of a single first outer portion 1b per unit area can thus be higher than the emission intensity of a single inner portion 1a per unit area in a state in which the same amount of electricity is supplied to the light sources 20A each corresponding to a respective one of the first outer portion 1b and the inner portion 1a. Similarly, the area of a single second outer portion 1c is smaller than the area of a single inner portion 1a in a plan view. The emission intensity of a single second outer portion 1c per unit area can thus be higher than the emission intensity of a single inner portion 1a per unit area in a state in which the same amount of electricity is supplied to the light sources 20A each corresponding to a respective one of the second outer portion 1c and the inner portion 1a. Accordingly, the reduction in luminance on the perimeter of the light-guiding member 10 can be compensated in the all-lit state, and the unevenness in luminance on the light-exiting surface of the surface light source can be reduced.

For example, the area of a single outer portion can be smaller than at least the area of the inner portion 1a closest to the center of the light-guiding member 10 in a plan view as shown in FIG. 1A. The center of the light-guiding member 10 in a plan view refers to the centroid of the light-guiding member 10. For example, in the case in which the light-guiding member 10 has a quadrangular shape, the center of the light-guiding member 10 is located at the intersection point of the two diagonals of the light-guiding member 10 in a plan view. In the case where an inner portion 1a overlaps the center of the light-guiding member 10 in a plan view, the inner portion 1a overlapping the center of the light-guiding member 10 serves as the inner portion 1a closest to the center of the light-guiding member 10. In the case where the inner portion 1a does not overlap the center of the light-guiding member 10 in a plan view, an inner portion 1a having an outer edge (lateral surface adjacent to a groove 14) closest to the center of the light-guiding member 10 is the inner portion 1a closest to the center of the light-guiding member 10. In this case, a plurality of inner portions 1a can be closest to the center of the light-guiding member 10, and any of the inner portions 1a may be regarded as the inner portion 1a closest to the center of the light-guiding member 10.

In the present specification, a single first outer portion 1b having an area smaller than the area of an inner portion 1a is a first outer portion 1b among a plurality of first outer portions 1b. Also, a single second outer portion 1c having an area smaller than the area of an inner portion 1a is a second outer portion 1c among a plurality of second outer portions 1c. There may be a case in which a plurality of first outer portions 1b have respective areas each smaller than the area of an inner portion 1a, or in which a plurality of second outer portions 1c have respective areas each smaller than the area of an inner portion 1a. All the first outer portions 1b and all the second outer portions 1c may each have an area smaller than the area of one inner portion 1a. In this case, the unevenness in luminance in the all-lit state on the light-exiting surface of the surface light source can be further reduced.

Each first outer portion 1b may have any appropriate area. The area of a single first outer portion 1b is preferably 0.5 times or more and 0.8 times or less as large as the area of a single inner portion 1a. When the area of a single first outer portion 1b is 0.5 times or more as large as the area of a single inner portion 1a, the first outer portion 1b can be easily prevented from being excessively bright. When the area of a single first outer portion 1b is 0.8 times or less as large as the area of a single inner portion 1a, the first outer portion 1b can be easily prevented from being excessively dark. Each second outer portion 1c may have any appropriate area. The area of a single second outer portion 1c is preferably 0.2 times or more and 0.7 times or less as large as the area of a single inner portion 1a. When the area of a single second outer portion 1c is 0.2 times or more as large as the area of a single inner portion 1a, the second outer portion 1c can be easily prevented from being excessively bright. When the area of a single second outer portion 1c is 0.7 times or less as large as the area of one inner portion 1a, the second outer portion 1c can be easily prevented from being excessively dark.

Among the outer portions, the number of light-emitting portions 1 adjacent to one second outer portion 1c located at a corner of the light-guiding member 10 is smaller than the number of light-emitting portions 1 adjacent to one first outer portion 1b located at a position other than the corners. The luminance at the corner tends to be particularly dark in the outer peripheral portion of the light-guiding member 10 in the all-lit state. The emission intensity of one second outer portion 1c per unit area is thus preferably higher than the emission intensity of one first outer portion 1b per unit area in a state in which the area of one second outer portion 1c is smaller than the area of one first outer portion 1b and in which the same amount of electricity is supplied to the light sources 20A of the respective first outer portions 1b and second outer portions 1c.

The unevenness in luminance on the light-exiting surface of the surface light source in the all-lit state can be further reduced by making the light sources 20A of the first outer portions 1b and/or the second outer portions 1c brighter than the light sources 20A of the inner portions 1a in addition to making the area of one first outer portion 1b and/or one second outer portion 1c smaller than the area of one inner portion 1a. For example, the light sources 20A of the first outer portions 1b and/or the second outer portions 1c can be brighter than the light sources 20A of the inner portions 1a by making the amount of electricity supplied to the light sources 20A of the first outer portions 1b and/or the second outer portions 1c larger than the amount of electricity supplied to the light sources 20A of the inner portions 1a. For example, when the sizes of the light sources 20A of the first outer portions 1b and/or the second outer portions 1c is larger than the sizes of the light sources 20A of the inner portions 1a, the light sources 20A of the first outer portions 1b and/or the second outer portions 1c can be brighter than the light sources 20A of the inner portions 1a.

The grooves 14 include first grooves 14-1 and second grooves 14-2 as shown in FIG. 1A. The first grooves 14-1 are located between adjacent first outer portions 1b and between the first outer portions 1b and the second outer portions 1c. The second grooves 14-2 are located between adjacent inner portions 1a. The first grooves 14-1 and the second grooves 14-2 are located on the same straight lines in the first direction X. The first grooves 14-1 and the second grooves 14-2 are located on the same straight lines in the second direction Y. The grooves 14 further include third grooves 14-3 located between the first outer portions 1b and the inner portions 1a and between the second outer portions 1c and the inner portions 1a. The first grooves 14-1 between the first outer portions 1b and the second outer portions 1c adjacent to each other in the second direction Y and the third grooves 14-3 are located on the same straight lines in the first direction X. The first grooves 14-1 between the first outer portions 1b and the second outer portions 1c adjacent to each other in the first direction X and the third grooves 14-3 are located on the same straight lines in the second direction Y.

The structure shown in FIG. 1A is obtained by disposing the light-guiding member 10 on the supporting member 50, forming the grooves 14, and dividing the light-guiding member 10 into a plurality of light-emitting portions 1. The method of disposing the light-guiding member 10 on the supporting member 50 and then dividing the light-guiding member 10 into a plurality of light-emitting portions 1 makes the manufacture easy as compared with a method of disposing on the supporting member 50 individual light-emitting portions 1 separated before being disposed on the supporting member 50. Also, the accuracy of position of each light-emitting portion 1 on the supporting member 50 can be enhanced. The structure shown in FIG. 1A can also be obtained by disposing on the supporting member 50 individual light-emitting portions 1 separated before being disposed on the supporting member 50.

The first grooves 14-1 and the second grooves 14-2 can be misaligned in the first direction X and can be misaligned in the second direction Y as in the example shown in FIG. 1B. The misalignment of the first grooves 14-1 and the second grooves 14-2 in the first direction X can inhibit the surface light source from being bent. The light-guiding member 10 is divided by the grooves 14. The strength of the portions of the surface light source at which the grooves 14 are located tends to be reduced. With the first grooves 14-1 and the second grooves 14-2, which tend to cause reduction in the strength of the surface light source, located apart from each other in the first direction X can suppress bending of the surface light source along the second direction Y. Similarly, with the first grooves 14-1 and the second grooves 14-2 arranged offset from each other in the second direction Y, bending of the surface light source can be reduced. The first grooves 14-1 between the first outer portions 1b and the second outer portions 1c adjacent to each other in the second direction Y and the third grooves 14-3 are located on the same straight lines in the first direction X. The first grooves 14-1 between the first outer portions 1b and the second outer portions 1c adjacent to each other in the first direction X and the third grooves 14-3 are located on the same straight lines in the second direction Y. The first grooves 14-1 between the first outer portions 1b and the second outer portions 1c adjacent to each other in the second direction Y and the third grooves 14-3 may not be located on the same straight lines in the first direction X. This structure allows for reducing bending of the surface light source. The first grooves 14-1 between the first outer portions 1b and the second outer portions 1c adjacent to each other in the first direction X and the third grooves 14-3 may not be located on the same straight lines in the second direction Y. This structure allows for reducing bending of the surface light source.

The structure shown in FIG. 1B can be obtained by dividing the light-guiding member 10 into a plurality of light-emitting portions 1 by the grooves 14 and then disposing the light-emitting portions 1 on the supporting member 50. The structure shown in FIG. 1B can also be obtained by disposing the light-guiding member 10 on the supporting member 50, forming the grooves 14, and dividing the light-guiding member 10 into a plurality of light-emitting portions 1. In one example of other manufacturing methods, a first portion constituting a plurality of inner portions 1a of the light-guiding member 10 is disposed on the supporting member 50. The first portion disposed on the supporting member 50 is a structure that has not been divided yet. The grooves 14 are then formed in the first portion disposed on the supporting member 50 to separate the first portion into a plurality of inner portions 1a. After that, a plurality of separated first outer portions 1b and second outer portions 1c are disposed on the supporting member 50. The structure shown in FIG. 1B can be obtained also in this manner.

An exemplary embodiment of the present invention has been described with reference to specific examples. However, the present invention is not limited by these specific examples. All embodiments that can be implemented by a person skilled in the art by appropriately changing configurations on the basis of the embodiment of the present invention described above are within the scope of the present invention as long as the gist of the present invention is included. In addition, a person skilled in the art can think of other various modifications and amendments within the idea of the present invention, and the modifications and amendments are also within the scope of the present invention.

What is claimed is:

1. A surface light source comprising:
a light-guiding member comprising a plurality of light-emitting portions separated by grooves;
a plurality of light sources each corresponding to a respective one of the plurality of light-emitting portions; and
a supporting member supporting the light-guiding member and the plurality of light sources,
wherein the light-guiding member is transmissive at a peak wavelength of the plurality of light sources,
wherein the plurality of light-emitting portions include
a plurality of outer portions, and
at least one inner portion located in a region surrounded by the plurality of outer portions in a plan view,
wherein each of the plurality of outer portions is adjacent to a smaller number of the light-emitting portions than a number of the light-emitting portions adjacent to a single inner portion of the at least one inner portion in a plan view,
wherein an area of a single outer portion of the plurality of outer portions is smaller than an area of the single inner portion in the plan view,
wherein the supporting member includes
a wiring board,
a first adhesive layer disposed on the wiring board,
a light-reflective member disposed on the first adhesive layer, and
a second adhesive layer disposed on the light-reflective member,
wherein the second adhesive layer contacts the light-guiding member and the plurality of light sources,
wherein the first adhesive layer is a resin layer containing light scattering particles, and
wherein the light-reflective member is a resin member containing a large number of air bubbles.

2. The surface light source according to claim 1,
wherein the plurality of outer portions include first outer portions and second outer portions,
wherein at least one of the second outer portions is adjacent to a smaller number of the light-emitting portions than a number of the light-emitting portions adjacent to one of the first outer portions, and
wherein an area of at least one of the second outer portions is smaller than an area of one of the first outer portions in the plan view.

3. The surface light source according to claim 2,
wherein the at least one inner portion comprises a plurality of inner portions,
wherein the grooves include a first groove located between adjacent ones of the plurality of outer portions and a second groove located between adjacent ones of the plurality of inner portions, and
wherein the first groove and the second groove are located on a same straight line.

4. The surface light source according to claim 2, wherein the area of the single outer portion is smaller than an area of an inner portion of the at least one inner portion closest to a center of the light-guiding member in the plan view.

5. The surface light source according to claim 2, wherein the area of the single outer portion is 0.5 times or more and 0.8 times or less as large as the area of the single inner portion.

6. The surface light source according to claim 1,
wherein the at least one inner portion comprises a plurality of inner portions,
wherein the grooves include a first groove located between adjacent ones of the plurality of outer portions and a second groove located between adjacent ones of the plurality of inner portions, and
wherein the first groove and the second groove are located on a same straight line.

7. The surface light source according to claim 1, wherein the area of the single outer portion is smaller than an area of an inner portion of the at least one inner portion closest to a center of the light-guiding member in the plan view.

8. The surface light source according to claim 1, wherein the area of the single outer portion is 0.5 times or more and 0.8 times or less as large as the area of the single inner portion.

9. A surface light source comprising:
a light-guiding member comprising a plurality of light-emitting portions separated by grooves;
a plurality of light sources each provided corresponding to a respective one of the plurality of light-emitting portions; and
a supporting member supporting the light-guiding member and the plurality of light sources,
wherein the light-guiding member is transmissive at a peak wavelength of the plurality of light sources,
wherein the plurality of light-emitting portions include
a plurality of outer portions, and
at least one inner portion located in a region surrounded by the plurality of outer portions in a plan view,
wherein each of the plurality of outer portions is adjacent to a smaller number of the light-emitting portions than a number of the light-emitting portions adjacent to one of the at least one inner portion in a plan view,
wherein more than one of the plurality of outer portions have respective areas each smaller than the area of an inner portion of the at least one inner portion
wherein the supporting member includes
a wiring board,
a first adhesive layer disposed on the wiring board,
a light-reflective member disposed on the first adhesive layer, and
a second adhesive layer disposed on the light-reflective member,
wherein the second adhesive layer contacts the light-guiding member and the plurality of light sources,
wherein the first adhesive layer is a resin layer containing light scattering particles, and
wherein the light-reflective member is a resin member containing a large number of air bubbles.

\* \* \* \* \*